United States Patent
Austermann

[11] 3,804,467
[45] Apr. 16, 1974

[54] FRONT AXLE

[75] Inventor: John F. Austermann, Berkley, Mich.

[73] Assignee: Lear Siegler Inc., Detroit, Mich.

[22] Filed: July 20, 1972

[21] Appl. No.: 273,664

Related U.S. Application Data

[63] Continuation-in-part of Ser. No. 158,836, July 1, 1971, abandoned.

[52] U.S. Cl............................ 301/127, 301/124 R
[51] Int. Cl...................... B60b 35/06, B60b 35/08
[58] Field of Search.......... 301/124 R, 127; 267/52; 72/367

[56] References Cited
UNITED STATES PATENTS

| | | | |
|---|---|---|---|
| 1,841,735 | 1/1932 | Hufferd | 301/124 R |
| 1,592,755 | 7/1926 | Bugatti | 301/124 R |
| 3,469,860 | 9/1969 | Hutchens | 267/52 |
| 2,611,656 | 9/1952 | Vanderberg | 301/124 R |
| 2,685,479 | 8/1954 | Buckendale | 301/124 R |
| 3,154,323 | 10/1964 | Hooven | 267/52 |
| 3,231,291 | 1/1966 | Kozicki | 267/52 |

*Primary Examiner*—Robert S. Ward, Jr.
*Assistant Examiner*—Reinhard J. Eisenzopf
*Attorney, Agent, or Firm*—Reising, Ethington & Perry

[57] ABSTRACT

A front axle and the method of making same wherein the axle includes a central portion with a square cross section and wing end portions extending upwardly and outwardly from the central portion and having changing cross sections which change from the square cross section adjacent the central portion to a wing cross section having two elongated sides interconnected by two ends, at one of which is arcuate. In one embodiment, the wing cross section is oval and in another embodiment the wing cross section has converging sides. The wing portions taper toward the distal ends thereof and a king pin support hub is integral with and disposed at the distal end of each wing portion. The axle is made from a tubular member by forming the central portion of the tubular member into a square cross section by successively reducing the diameter of the end portions of the tube and gathering the end portions of the tube by shortening same to increase the wall thicknesses thereof and flattening the sides of the end portions to obtain the wing cross section and a terminal length which is substantially solid and of a rectangular cross section to define a king pin support hub.

7 Claims, 16 Drawing Figures

INVENTOR.
John F. Austermann

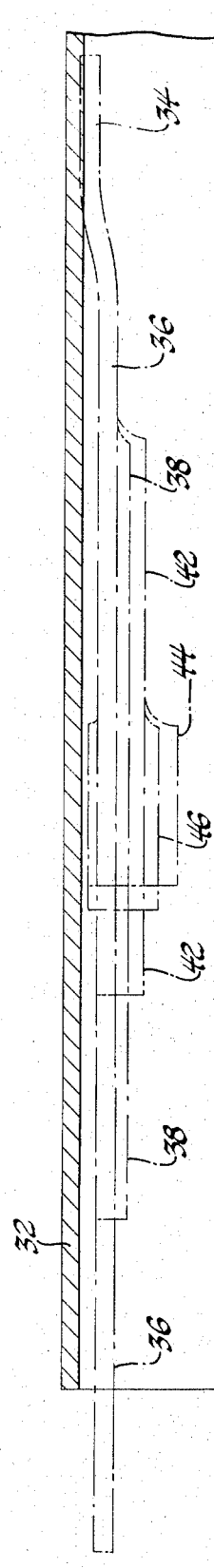
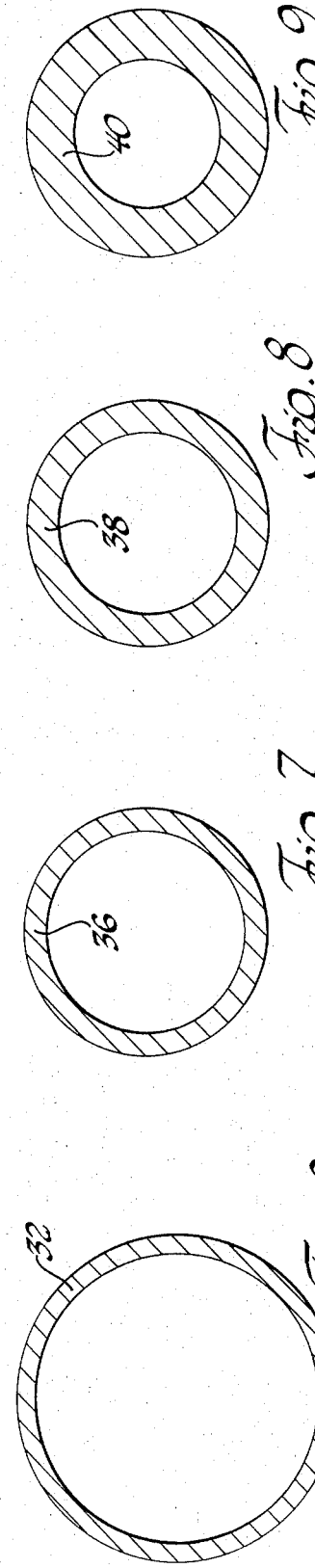
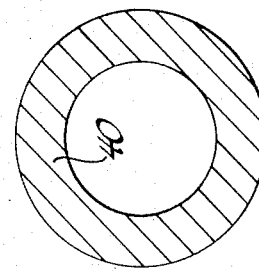
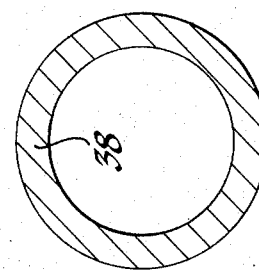
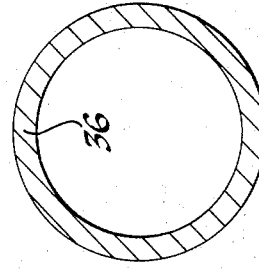
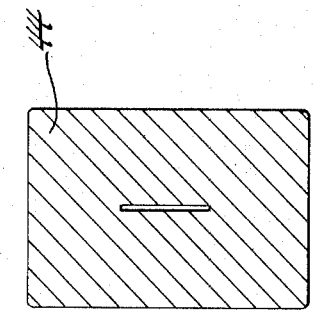
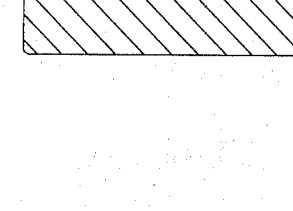
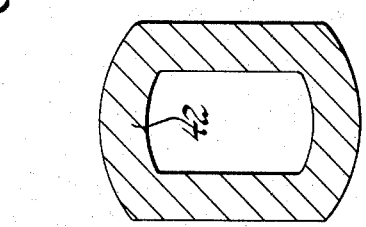

ID
FRONT AXLE

This application is a continuation-in-part of copending application Ser. No. 158,836 filed July 1, 1971, now abandoned, and assigned to the assignee of the instant invention.

This invention relates to an improved front axle of the type utilized in motor vehicles and to the method of manufacturing such an improved front axle.

Non-driving axles such as the front axles in automobiles are normally made of I-beams which are solid in cross section or of tubular beams which are hollow. Tubular beams are usually preferred because they incorporate a minimum of material with a maximum of strength and rigidity.

Most front axles have a central straight portion and wing or arm portions extending upwardly and outwardly from the ends thereof and terminating in king pin support hubs. Because of the clearance problems associated with the wing portions of the axles there is a limitation on the size of the wing portions. Furthermore, particular attention must be given to these wing portions because of the torsional load to which they are subjected.

Accordingly, it is an object and feature of this invention to provide an improved front axle which includes a central portion having a generally four sided cross section and wing or arm portions at each end of the central portion with each wing portion changing in cross section from the four sided cross section to a wing cross section having two elongated sides interconnected by two ends, at least one of which is arcuate, in the direction toward the distal ends thereof.

In correlation with the foregoing objects and features, it is another object and feature of this invention to provide such an axle wherein the wing cross section is oval.

It is another object and feature of this invention to provide such an axle wherein the wing cross section is one having converging sides.

In correlation with the foregoing objects and features, it is another object and feature of this invention to provide such an axle wherein the wall thickness of each wing portion increases from the central portion toward the hub portion and wherein the walls taper toward one another.

In correlation with the foregoing objects and features, it is another object and feature of this invention to provide a novel method of forming such a front axle.

Other objects and attendant advantages of the present invention will be readily appreciated as the same becomes better understood by reference to the following detailed description when considered in connection with the accompanying drawings wherein:

FIG. 5 is a view showing one-half of a basic tubular member utilized in the method of making front axle and with the successive steps shown in phantom and labeled;

FIG. 6 is a cross sectional view of the basic tube utilized to form the front axle;

FIG. 7 is a cross sectional view of the end portion of the tube after the first step in forming the front axle;

FIG. 8 is a cross sectional view of the end portion of the tube after the next step in forming the front axle;

FIG. 9 is a cross sectional view of the tube following the succeeding step in forming the front axle;

FIG. 10 is a cross sectional view of the end portion following the next step in forming the front axle;

FIG. 11 is a cross sectional view of the end portion following a further step in forming the front axle;

FIG. 12 is a cross sectional view of the hub portion at the terminal end following yet another step in the formation of the front axle;

Figure 1:
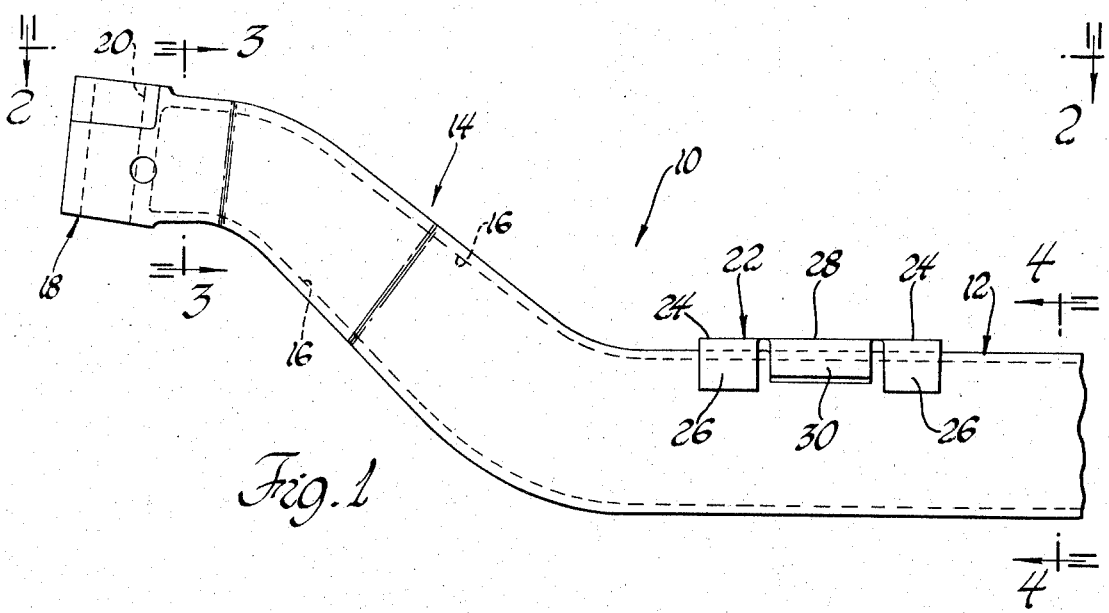
FIG. 1 is a fragmentary elevational view of approximately one-half of a preferred embodiment of a front axle constructed in accordance with the instant invention.
Figure 2:
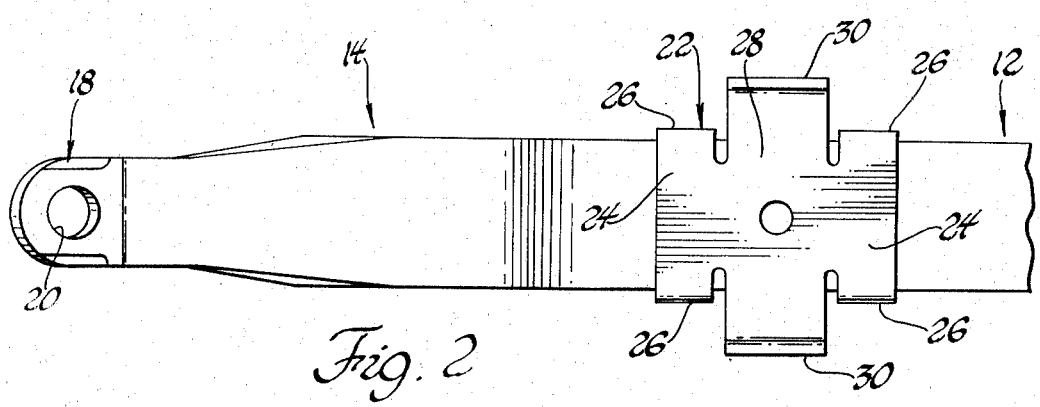
FIG. 2 is a view taken substantially along line 2—2 of FIG. 1.

A first preferred embodiment of a front axle constructed in accordance with the instant assembly is generally shown at 10 in FIG. 1.

Figure 4:
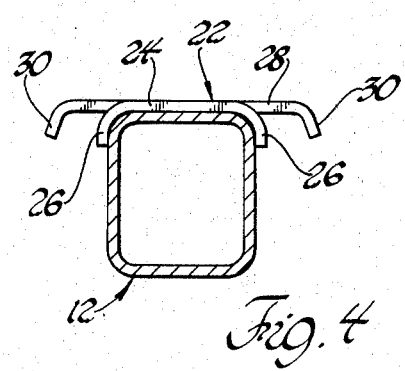
FIG. 4 is a cross sectional view taken substantially along line 404 of FIG. 1.

The front axle 10 includes a central portion generally indicated at 12 and having a generally four sided cross section. More specifically, the central portion 12 has a square cross section as best shown in FIG. 4.

Figure 3:
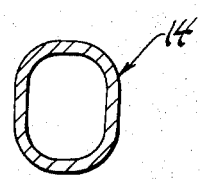
FIG. 3 is a cross sectional view taken substantially along line 3—3 of FIG. 1.

A wing or arm portion, generally shown at 14, extends from each end of the central portion 12. Each wing portion 14 changes in cross section from the square cross section of the central portion 12 to a wing cross section having two elongated sides 13 interconnected by two ends 15, both of which are generally arcuate, in the direction toward the distal end thereof. More specifically the cross section is oval and as shown in FIG. 3.

Although barely perceivable in FIG. 1, the walls 16 increase in thickness along the wing portions in the direction from the central portion 12 toward the distal ends thereof. Furthermore, the walls 16 (which include the entire periphery of the cross section of the wing portions 14) taper toward one another in a direction toward the distal ends thereof. In other words, the wing portions 14 are tapered in the direction toward the distal ends. Each wing portion also extends upwardly and outwardly from the central portion 12 toward the distal end thereof. In other words, bends extend from the central portion 12 into the respective wing portions 14. A king pin support hub generally indicated at 18 is integral with and disposed at the distal end of each wing portion 14. Each king pin support hub has a bore 20 therein for supporting a front wheel assembly.

A pair of spaced spring pads, one of which is generally indicated at 22, are secured, as by welding, to the central portion 12 of the axle. Each spring pad 22 comprises a plate with side sections 24 having end portions 26 bent at least partially around the central portion 12 of the axle. The bent end portions 26 of each spring pad are welded to the axle. Each spring pad also includes a central section 28 between the side sections 24 and having bent ends 30 disposed outwardly and spaced from the axle.

The method of making the front axle 10 is best illustrated in FIGS. 5 through 12.

More specifically, the front axle 10 is made from a metal tubular member 32. Broadly, the axle is made by forming the central portion of the tube 32 into a cross section having four sides (i.e., generally) and forming the ends of the tube into wing portions having a cross section changing from the square cross section of the central portion to an oval cross section in the direction toward the distal ends. The end portions of the tubular member are shortened or gathered to increase the wall thickness in a manner that the wall thickness increases in the direction toward the distal ends.

The first step in forming the front axle from the tubular member 32 is a cold step wherein the central portion of the tubular member is formed into a square cross section, as indicated at 34, while at the same time reducing the diameter of the end portion while increasing the length thereof as indicated at 36.

Thereafter, the end portions are gathered by shortening same to increase the wall thickness thereof. More specifically, the end portion of the tube is gathered or shortened to increase the wall thickness thereof as indicated at 38. Immediately following this gathering step there is included another gathering step to further increase the wall thickness by shortening the tube so that it has the configuration as shown at 40 in FIG. 9. These steps are then followed by a hammering or flattening step which results in the configuration shown at 42. As best seen at 42 in FIG. 10, the flattening results in a cross section which includes spaced, generally parallel side walls.

Subsequently, only the terminal length of each end portion is gathered to increase the wall thickness to the point where each terminal section has a substantially solid rectangular cross section as shown at 44. This gathering includes two successive gathering steps, the first of which gathers and shortens the terminal length of each end portion to the configuration shown at 46 and the second of which results in the cross sectional configuration shown at 44.

A bore is subsequently formed in the substantially solid rectangular cross section 44 to define the king pin support hub 18. The end portions are bent into wing or arm portions which extend upwardly and outwardly from the central portion of the axle.

Figure 13:
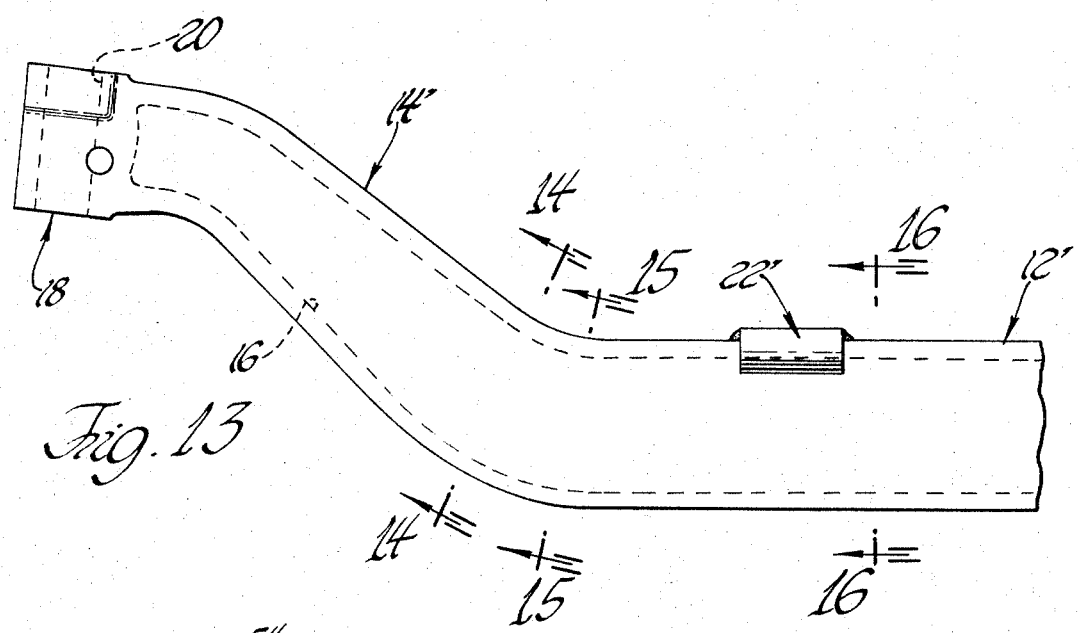
FIG. 13 is a fragmentary elevational view of approximately one-half of an alternative embodiment of a front axle constructed in accordance with the instant invention.
Figure 14:
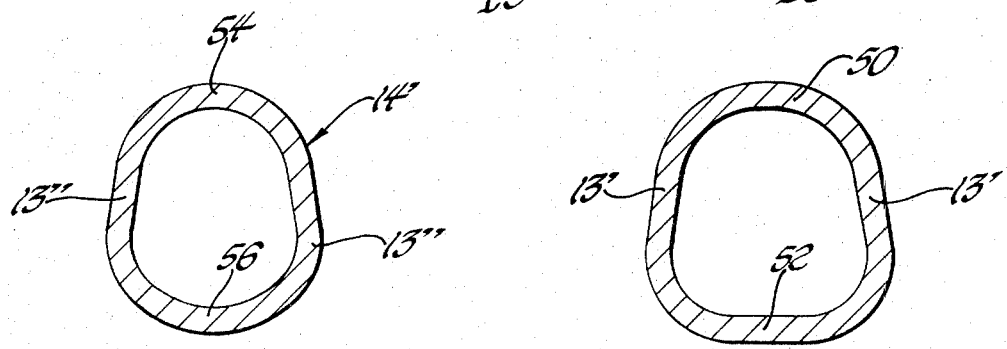
FIG. 14 is a cross sectional view taken substantially along line 14—14 of FIG. 13.
Figure 15:
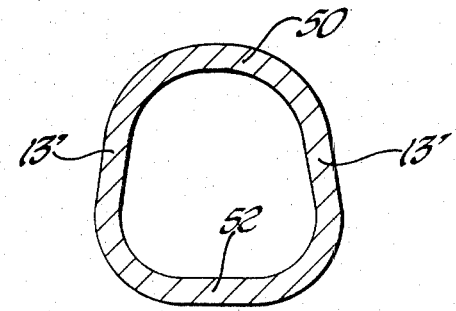
FIG. 15 is a cross sectional view taken substantially along line 15—15 of FIG. 13.
Figure 16:
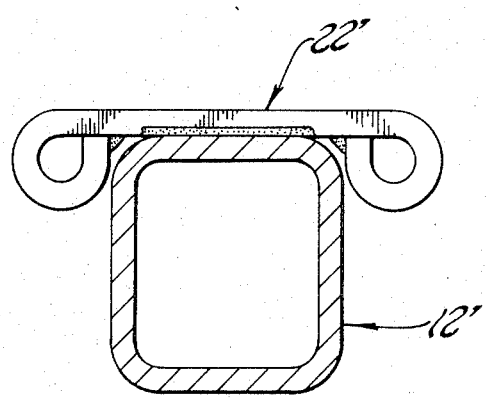
FIG. 16 is a cross sectional view taken substantially along line 16—16 of FIG. 13.

A second preferred embodiment of a front axle constructed in accordance with the instant invention is generally shown at 10' in FIG. 13 and in various cross sections in FIGS. 14 through 16. The structural features of the front axle 10' which are the same as those of the previously described embodiment are indicated with like numerals and the previous description applies whereas features of the front axle 10' which are different but comparable to those of the first described embodiment are indicated with the like numeral having a prime designation.

The front axle 10' includes a central portion generally indicated at 12' having a generally four sided square cross section, as best seen in FIG. 16.

The front axle 10' also includes a wing or arm portion generally shown at 14', which extends from each end of the central portion 12'. As alluded to in connection with the description of the front axle 10, there is a bend interconnecting the central portion 12' and the wing portion 14' of the front axle 10'. The respective cross sections of FIGS. 14 and 15 are taken along the bend.

The front axle 10' differs from the previously described front axle 10 in the cross sectional configuration through the bend and extending from the central portion 12' into the wing portion 14'. More specifically, the wing cross section in the initial portion of the bend adjacent the central portion 12' includes one end 50 which is arcuate with the other end 32 being generally flat, the two ends being interconnected by the generally elongated flat sides 13'. The cross section then changes along the bend in the direction toward the distal end of the wing portion to that shown in FIG. 14 wherein the cross section has the elongated generally flat sides 13'' interconnected by arcuate ends 54 and 56. Thus, generically both of the cross sections of FIGS. 14 and 15 include two sides which converge toward one another.

It will be noted that the ends 54 and 56 are of different radii and the curve or end 54 of the smallest radius is on the inside of the bend extending from the central portion 12' into the wing portion 14'.

The cross sectional configurations illustrated in FIGS. 14 and 15 with converging sides are important because they can withstand the maximum loads while utilizing the minimum amount of material. Furthermore, the cross sectional configuration having the sides converging upwardly toward the top of the bend in the front axle is important for accepting the stresses in the bend of the front axle. The cross sectional configuration as illustrated in FIGS. 14 and 15 places the neutral axis (i.e. the axis of neutral stress or where tension changes to compression) is displaced from the centroidal or axis of symmetry.

It will be noted that the front axle 10' like the axle 10 has an increasing wall thickness as indicated at 16'.

The front axle 10' may be fabricated in the method described in connection with FIGS. 5 through 12 or may be made differently depending upon the size of the axle. For example, the axle 10' may be made from a tubular member wherein its ends are reduced in diameter and lengthened then tapered with the square central portion formed therein and the wing portions bent upwardly and outwardly into a "s" shape as the sides 13' and 13'' are formed therein. The gathering steps may be included as described above as required for the particular size of axle.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A front axle including: a central portion with a generally four sided cross section; a wing portion at each end of said central portion; each wing portion changing in cross section from said four sided cross section to a wing cross section having two elongated sides interconnected by two ends, at least one of which is arcuate, in the direction toward the distal end thereof; the wall thickness of each wing portion increasing therealong in said direction; the walls of each wing portion tapering toward one another in said direction; said central portion being generally square in cross section; each wing portion extending upwardly and outwardly from said central portion toward said distal end; said two sides of said wing cross section converging toward one another; a bend in said axle between said central portion and said wing portion, and wherein said wing cross section in the initial portion of said bend includes one end which is arcuate with the other end generally flat, and which wing cross section in said direction through said bend changes to one wherein both of said ends are arcuate.

2. An axle as set forth in claim 1 wherein said ends of said wing cross section which are arcuate have different radii with the smallest radius being on the inside of said bend.

3. An axle as set forth in claim 1 including a king pin support hub integral with and disposed at the distal end of each wing portion.

4. An axle as set forth in claim 1 including a pair of spaced spring pads secured to said central portion.

5. An axle as set forth in claim 4 wherein each spring pad comprises a plate with side sections bent at least partially around said axle and a central section therebetween having bent ends disposed outwardly of said axle.

6. A front axle including: a central portion with a hollow, generally four-sided cross-section; a wing section extending from each end of said central portion having a hollow cross-section that decreases toward its outer ends and changes from the four-sided cross-section of the central portion; the cross-section of each wing section at least in the transition zone adjacent the central portion having an upper arcuate end and a lower end joined by two straight sides, the radius of curvature of said upper arcuate end being such that the straight sides converge toward the upper arcuate end from the lower end such that the upper arcuate end provides increased resistance to deflection caused by forces tending to bend the wing section upwardly about the central portion.

7. A front axle as claimed in claim 6 wherein said lower end progressively changes in contour in the transition zone from a generally flat contour joined to the lower ends of said upwardly converging sides by curved sections to an arcuate contour having a radius of curvature larger than the radius of curvatures of said upper arcuate end.

* * * * *